United States Patent [19]

Harrelson, III

[11] Patent Number: 6,038,778
[45] Date of Patent: Mar. 21, 2000

[54] SHAFT COMPRESSION PACKING RULER

[75] Inventor: Albert L. Harrelson, III, Marion, N.Y.

[73] Assignee: Garlock Inc, Palmyra, N.Y.

[21] Appl. No.: 09/096,910

[22] Filed: Jun. 12, 1998

Related U.S. Application Data

[60] Provisional application No. 60/049,761, Jun. 16, 1997.

[51] Int. Cl.[7] .............................. G01B 3/02; G01B 3/04
[52] U.S. Cl. .............................. 33/483; 33/485; 33/494; 33/833; 33/836
[58] Field of Search .............................. 33/483, 484, 485, 33/494, 501.45, 679.1, 832, 833, 836

[56] References Cited

U.S. PATENT DOCUMENTS

| | | | |
|---|---|---|---|
| 2,183,063 | 12/1939 | Dorsey | 33/194 |
| 2,645,019 | 7/1953 | Jones | 33/483 |
| 3,293,761 | 12/1966 | Curry | 33/494 |
| 3,795,982 | 3/1974 | Cunningham | 33/494 |
| 5,163,231 | 11/1992 | Craig | 33/501.45 |
| 5,226,428 | 7/1993 | Lee . | |
| 5,328,479 | 7/1994 | Gurmarnik . | |
| 5,419,053 | 5/1995 | Kathan . | |
| 5,471,757 | 12/1995 | Mcdonald | 33/501.45 |
| 5,746,001 | 5/1998 | Fisher . | |

FOREIGN PATENT DOCUMENTS 692621  8/1964  Canada .................................. 33/107

*Primary Examiner*—Diego Gutierrez
*Assistant Examiner*—Faye Francis
*Attorney, Agent, or Firm*—Cummings & Lockwood

[57] ABSTRACT

A ruler for aiding in packing a stuffing box surrounding a shaft having a measurement scale comprising at least one mark for delineating the optimal compressed height of a compressible set of packing rings, each packing ring having about the same optimal compression and dimension, and a linear series of graduation marks of repeat basic measurements units for delineating by the distance between the graduation marks the height of non-compressible bushing rings of about the same dimension.

8 Claims, 12 Drawing Sheets

Quick Set – 5 Ring Packing Set

Compressed Packing Stack Height With Additional Bushing Rings

| Packing Cross Section | Uncomp. Stack Height | Comp. Stack Height | 1 | 2 | 3 | 4 | 5 | 6 | 7 |
|---|---|---|---|---|---|---|---|---|---|
| 1/8" | 0.625 | 0.438 | 0.563 | 0.688 | 0.813 | 0.938 | 1.063 | 1.188 | 1.313 |
| 3/16" | 0.938 | 0.656 | 0.844 | 1.031 | 1.219 | 1.406 | 1.594 | 1.781 | 1.969 |
| 1/4" | 1.250 | 0.875 | 1.125 | 1.375 | 1.625 | 1.875 | 2.125 | 2.375 | 2.625 |
| 5/16" | 1.563 | 1.094 | 1.407 | 1.719 | 2.032 | 2.344 | 2.657 | 2.969 | 3.282 |
| 3/8" | 1.875 | 1.313 | 1.688 | 2.063 | 2.438 | 2.813 | 3.188 | 3.563 | 3.938 |
| 7/16" | 2.188 | 1.531 | 1.969 | 2.406 | 2.844 | 3.281 | 3.719 | 4.156 | 4.594 |
| 1/2" | 2.500 | 1.750 | 2.250 | 2.750 | 3.250 | 3.750 | 4.250 | 4.750 | 5.250 |
| 9/16" | 2.813 | 1.969 | 2.532 | 3.094 | 3.657 | 4.219 | 4.782 | 5.344 | 5.907 |
| 5/8" | 3.125 | 2.188 | 2.813 | 3.438 | 4.063 | 4.688 | 5.313 | 5.938 | 6.563 |
| 11/16" | 3.438 | 2.406 | 3.094 | 3.781 | 4.469 | 5.156 | 5.844 | 6.531 | 7.219 |
| 3/4" | 3.750 | 2.625 | 3.375 | 4.125 | 4.875 | 5.625 | 6.375 | 7.125 | 7.875 |
| 13/16" | 4.063 | 2.844 | 3.657 | 4.469 | 5.282 | 6.094 | 6.907 | 7.719 | 8.532 |
| 7/8" | 4.375 | 3.063 | 3.938 | 4.843 | 5.688 | 6.563 | 7.438 | 8.313 | 9.188 |
| 15/16" | 4.688 | 3.281 | 4.219 | 5.156 | 6.094 | 7.031 | 7.969 | 8.906 | 9.844 |
| 1" | 5.00 | 3.500 | 4.500 | 5.500 | 6.500 | 7.500 | 8.500 | 9.500 | 10.500 |

*Fig. 16*

SHAFT COMPRESSION PACKING RULER

CROSS-REFERENCE TO RELATED APPLICATION

This application claims the benefit of U.S. Provisional Application Ser. No. 60/049,761, filed Jun. 16, 1997, the disclosure of which is herein incorporated by reference.

BACKGROUND OF THE INVENTION

1. Field of the Invention

The present invention relates generally to a measurement tool for determining the number of packing material rings that are required to fill and seal a stuffing box cavity surrounding a shaft. More particularly, the present invention relates to a graduated ruler for indicating the number of compressible packing rings and/or non-compressible bushing rings that are required to fill and seal a stuffing box cavity surrounding a shaft.

2. Background of the Related Art

Compression packing is used to control leakage about shafts. Compression packing generally comprises an assembly of radially expandable rings that coaxially surrounds a shaft. Such packing is used in a wide variety of applications including packing for pumps, valves and hydraulic and pneumatic equipment.

Shafts are conventionally surrounded by a compartment generally extending outwardly from the housing surrounding the shaft referred to as a "packing box" or "stuffing box." The interior of the stuffing box is generally of a diameter sufficiently greater than the shaft to accommodate compressible "packing rings" and relatively non-compressible bushing rings. The packing rings in the stuffing box are generally compressed by a annular "gland" fitted about the shaft and bolted to the exterior of the stuffing box. Axial compressive loading force from the gland is applied to the packing rings causing them to expand radially to some extent, forcing the inner peripheries against the outer surface of the shaft and causing the packing rings to substantially fill the stuffing box to prevent or minimize the escape of the contents of the housing at the intersection of the shaft and housing. Tightening of the gland is conventionally by means of a flange through which bolts pass, and the bolts generally being threaded into threaded holes in the stuffing box. When the gland is tightened the packing rings are further compressed in the stuffing box.

Compression packing rings are frequently replaced due to daily wear and tear. Replacement of worn compression packing rings, and re-packing and/or replacement of comparatively non-compressible bushing rings or sleeves, which are both used to help fill the stuffing box in lieu of compression packing rings and to aid in the compression of the compression packing rings which are employed, is a laborious process subject to numerous calculations pertaining to the appropriate size and number of packing rings and bushings which should be employed.

The mechanic faced with packing, compressing and sealing a shaft in a stuffing box is faced with an number of variables that make the accomplishment of these tasks, on a routine basis, difficult. For example, the mechanic is faced with an extremely broad range of stuffing boxes having various inner diameters (ID) and outer diameters (OD), the possible combinations of the same running in the tens of thousands. Further, stuffing box depths can vary considerably with respect to the number of rings and sleeves needed to fill the box. The mechanic is also faced with numerous packing material types and styles that require different levels of compression in order to perform their sealing duties.

For a mechanic to appropriately pack a stuffing box, the mechanic must conventionally measure the inner and outer diameter dimensions of the stuffing box cavity, measure the stuffing box depth, select a proper packing material to be employed in the stuffing box having the correct packing cross-section (Stuffing Box Bore Dimension (OD)-Stem Diameter (ID)/2=Packing Cross-Section), determine the uncompressed stack height (=Number of Rings×Ring Cross-Sectional Height) and compressed stack height (=100%-Recommend Percent Compression/100 X Uncompressed Stack Height) of the selected packing material, determine the number of compression rings needed, and determine if any additional bushing rings or sleeves are required to fill the excess stuffing box depth space (Excess Box Depth=Actual Box Depth—Packing Set Compressed Height; Number of Bushing Rings Required=Excess Box Space/Cross-sectional Height of Bushings) after performing the appropriate calculations involved.

Given an adequate amount of time, the proper tools, and the proper training, a mechanic can perform all of the above steps and insure that the valves, pumps etc. that are packed are done with a high degree of accuracy. Unfortunately, this scenario is not typically the case. Mechanics are usually given a number of shafts that they are required to seal within a limited time frame. Calculation errors are not infrequent. The general location of most shafts usually does not typically lend an environment conducive to the required calculations and notes. As a result, most mechanics are required to attempt a high level of performance without the tools or time necessary to guarantee the accomplishment of the task.

There is, therefore, a need for a improved manner in which to pack a stuffing box. In particular, there is need for a quick and accurate method for packing a stuffing box without the need to make numerous calculations.

SUMMARY OF THE INVENTION

It is an object of the present invention to provide for an improved method and device for reducing the time and effort involved in packing stuffing boxes surrounding shafts. It is a further object of the present invention to reduce errors and miscalculations in the packing of stuffing boxes surrounding shafts. It is yet a further objective of the present invention to improve the accuracy involved in packing stuffing boxes.

The present invention accomplishes these and other objects thereof by providing packing rulers which eliminate much of the need for the many calculations conventionally made in packing a stuffing box. Such rulers, keyed to the type of (e.g., packing rings having the same optimal compression or same manufacture and/or composition), and dimensions of, packing materials to be used in packing the stuffing box, are provided with marks to delineate packing ring height with optimal compression. Such rulers may further be provided with graduated marks to delineate the height of standard bushing rings, which are either compressible or non-compressible. Such rulers may further be provided along one measurement scale with marks indicating both the height of multiple packing rings with optimal compression, as well as standard bushing ring heights such that the number of bushing rings needed to fill a stuffing box partially packed with the multiple packing rings optimally compressed may be easily determined. The packing ruler may further be inscribed along one dimension of the ruler with English and/or metric standard distance measurements. The ruler may also be inscribed along one dimension with graduations to represent packing rings under one amount of compression, and along another dimension with graduations to represent packing rings under another amount of compression. Inscriptions are preferably made along the length of the ruler, and may be applied along any length, both on the front side and back side of the ruler. A side or portion of the packing ruler may be left blank, or be inscribed with various data (e.g., instructions on the use of the ruler, nomenclature definitions, advertising, etc.).

In a preferred form of the invention, the ruler comprises an elongate flat rectangular body, preferably beveled on both longitudinal edges, and provided with one or more scales along one or more beveled edge. The ruler may have a hole therein so that a wide range of rulers can be carried on a ring or other conjoining item attached through each hole. In another preferred form of the invention the ruler is a tape measure which may be encased in a housing. The ruler may be fabricated from metal, plastic, paper, wood, or any non-toxic substrate. The packing ruler may be constructed to be repetitively re-used or may be constructed as a disposable item, which is intended to be discarded upon completion of its employment.

In another preferred embodiment there is provided as plurality of packing rulers to represent packing sets with any desired number of rings, with compressible or incompressible bushing rings or spool stock rings, with any desired percent compression target value. For example, without limitation, one ruler may have graduations imprinted thereon which correspond to spool stock rings of a certain dimension and material, another ruler may have graduations imprinted thereon with respect to non-compressible bushing rings of a certain dimension, another ruler may have graduations pertaining to packing sets utilizing five standard size packing rings having an optimal compressibility of about 25%, another ruler may have graduations pertaining to packing sets utilizing five standard size packing rings having an optimal compressibility of about 30%, while yet another ruler may have graduations pertaining to packing sets utilizing an entirely different number of packing rings having yet another optimal compressibility.

The concept of packing rulers becomes particularly viable when it is recognized that most stuffing boxes over the years designs have been standardized upon the use of five or six packing ring sets with uncompressed stack heights of about 5 or 6 times cross-section, and that while the range of compression of these packing rings may vary anywhere from about 15% to about 30%, most current packing ring designs are based upon either about 25% or about 30% optimal compression. Likewise, although there exists a very wide range of stuffing box ID and OD combinations, there are only 15 cross-sectional sizes between about 1/8" and about 1", with most common sizes between about 1/8" and about 5/8". By conforming a mark on the packing rulers to a set number of compressible packing rings having a height which is a multiple of cross-section, and having a standardized optimal compression, it is possible to further graduate the ruler to designate the additional height spaces that would be occupied by bushing rings. This is particularly so when the bushing rings are produced to the highest density to make them virtually incompressible.

For example, once the decision to use a particular packing design is made, for example to use a 5 ring set having a recommended compression of about 30%, a number of variables that are conventionally measured and calculated become givens. If the packing ruler is inscribed with the stack height anticipated upon such compression at the bottom end of its scale, then additional scribe marks can be positioned above this mark to designate the additional height spaces that would be occupied by square cross-section bushing rings that are substantially incompressible (the compressed stack height of such busing rings normally being the same as its uncompressed stack height).

In a stuffing box re-pack operation, the ID and OD dimensions of the stuffing box may be determined prior to unpacking the stuffing box. This allows the mechanic to have the correctly sized packing set and a number of correctly sized bushing rings at the start of re-pack. If the box is to be packed entirely with spool stock packing, knowing the cross-sectional size would enable the mechanic to have the proper sized spool stock packing on site at the time of the re-pack. The cross-sectional size of the stuffing box may also be estimated by using the width of the ruler as a feeler gauge. In one embodiment of the present invention, once the stuffing box is unpacked, the mechanic inserts a packing ruler gauged along one length to the height of a particular ring set at optimal compression, and having graduations thereafter gauged to the width of standard incompressible bushing rings, into the stuffing box cavity unit it rests on the bottom of the stuffing box. The mechanic then simply reads the scale at the point where the ruler is level with the top of the stuffing box. Rounding down to the nearest bushing ring scribe mark, the mechanic would be precisely informed on how many incompressible bushing rings are required in addition to the particular ring set having the defined optimum compression to yield a packing set having the desired compression and resulting in the desired stuffing box filling. By looking at the distance that separates the top of the stuffing box from the nearest penetrated scribed line, the mechanic also can determine with precision how much gland penetration is necessary to arrive at the desired compression.

One presently preferred embodiment is a ruler for aiding in packing a stuffing box surrounding a shaft which comprises: an elongate rectangular body having a top face and bottom face, opposite parallel longitudinal edges, and a measurement scale along one or more longitudinal edges; wherein said measurement scale comprises one or more marks to delineate the optimal compressed height of a compressible set of packing rings, all having about the same optimal compression and dimension, and a linear series of graduation marks of repeat basic measurement units delineating by the distance between said graduation marks the height of non-compressible bushing rings of about the same dimension.

Another aspect of the present invention includes a ruler comprising: an elongate rectangular body having a top face and bottom face, opposite parallel longitudinal edges, and a measurement scale along one or more longitudinal edges; wherein said measurement scale comprises a linear series of demarcations delineating by the distance between said demarcations the optimal compressed height of packing rings having about the same optimal compression and dimension.

The present invention further discloses a ruler set for aiding in packing a stuffing box surrounding a shaft comprising: two or more elongate rectangular bodies having a top face and bottom face, opposite parallel longitudinal edges, and a measurement scale along one or more longitudinal edges of each rectangular body; wherein each said rectangular body has a measurement scale thereon that differs from the other rectangular bodies and wherein said measurement scales comprise a linear series of graduation marks delineating by the distance between said graduation marks the height of one or more type of stuffing box packing material fabricated in an approximately uniform dimension and fashion.

Another aspect of the present invention includes a method for determining the number of uniform non-compressible bushing rings, encompassing a shaft, needed to fill a stuffing box, formed by a surrounding stuffing box housing: selecting a set of approximately uniform compressible packing rings having about the same optional compression; selecting an elongate ruler having along its length a mark delineating the height of said set of uniform compressible packing rings when optimally compressed as well as a linear series of graduation marks, superior to said mark, which delineate by the distance between said graduation marks the height of said uniform non-compressible bushing rings; inserting said ruler width-wise into said stuffing box; reading the non-compressible bushing ring mark on the ruler which most closely is associated with the top of the stuffing box housing surrounding the stuffing box.

In one embodiment of the present invention, the stuffing box is to be entirely filled with spool stock rings, each having the same optimal compression values. In such case, the ruler may be inscribed on one side with graduations relating to the height of the chosen packing rings at the desired compression. By looking at the distance that separates the top of the stuffing box from the nearest penetrated scribed line, the gland penetration depth may also be determined, as in the prior embodiment.

As would be understood by one of ordinary skill in the art, depending upon the type of service, the mechanic may install the packing set at the bottom and the bushing rings at the top, some bushing rings on the bottom and top with the packing set in the middle, or the busing rings at the bottom and the packing set at the top.

Other objects and advantages of the invention will be apparent from the following description, the accompanying drawings and the appended claims.

BRIEF DESCRIPTION OF THE DRAWINGS

So that those having ordinary skill in the art to which the subject invention appertains will more readily understand how to make and use the ruler described herein, and in order to further set forth other features and intended advantages of the present invention, preferred embodiments of the invention will be described in detail herein below with reference to the drawings wherein:

FIG. 16 is a chart showing example dimensions, in about a 30% compression, five ring packing set format, that could be followed in laying out the scribe lines for a typical series of rulers.

DETAILED DESCRIPTION OF THE PREFERRED EMBODIMENTS

Figure 1:
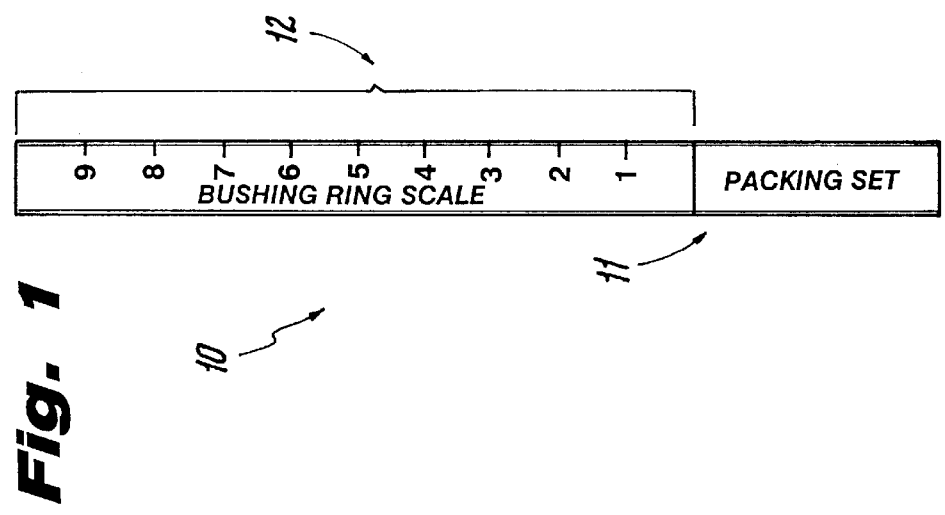
FIG. 1 is a front elevational view of a representative packing ruler of the present invention marked to indicate the height of a defined packing set at optimal compression and the height of a number of uniform, incompressible bushing rings thereon.

Referring now to the drawings wherein like reference numerals identify similar structural elements of the subject invention, there is illustrated in FIG. 1 a packing ruler constructed in accordance with the present invention, each such Packing Ruler designated by the reference numeral 10. As would be appreciated by one of ordinary skill in the art, the novel Packing Ruler Depicted offers clear advantages over the present method of packing stuffing boxes involving numerous calculations and choices. By demarcating on the packing ruler, at Packing Set Demarcation 11, the space which would be taken up by a standard set of packing rings at their optimal compression, and overlaying such Packing Set Demarcation 11 with a plurality of demarcations depicting the standard width of non-compressible bushing rings in a Bushing Ring Scale 12, as illustrated in the front elevational view of Packing Ruler 10 of FIG. 1, there is provided a quick and easy method for determining the number of bushings rings required to fill a stuffing box when such standard set of packing rings are utilized. For example, Packing Set Demarcation 11 may be based on a standard 5 or 6 packing ring set with an optimal compression of about 30%.

Figure 2:
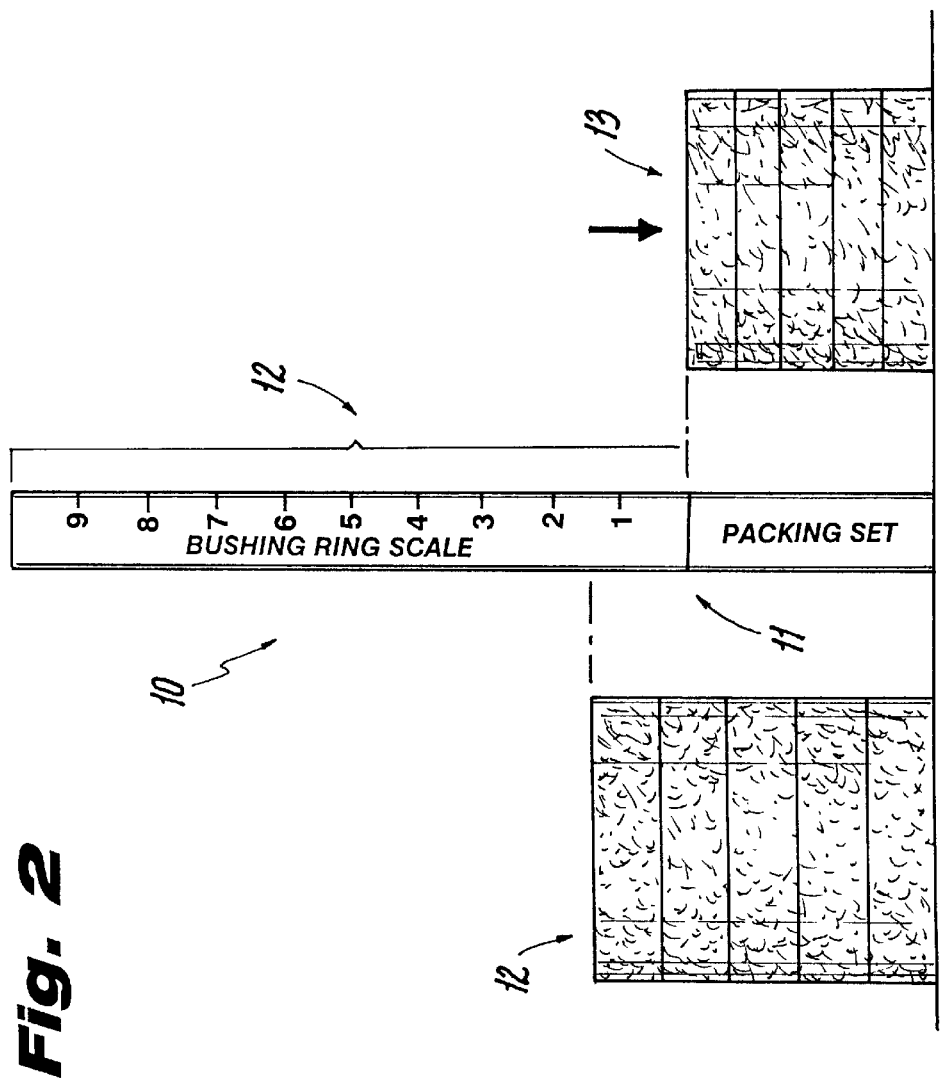
FIG. 2 is a front elevation view of a packing ruler of FIG. 1, illustrating an exemplary dimensional difference between a stack of uncompressed and compressed packing rings.

As illustrated in FIG. 2, Packing Set Demarcation 11 on Packing Ruler 10, takes into account the space filling dimensional differences between a Stack of Uncompressed Packing Rings 12 and the same stack being compressed optimally to form a Stack of Compressed Packing Rings 13, and thus demarcates the start of graduations on Bushing Ring Scale 12 accordingly.

Figure 4:
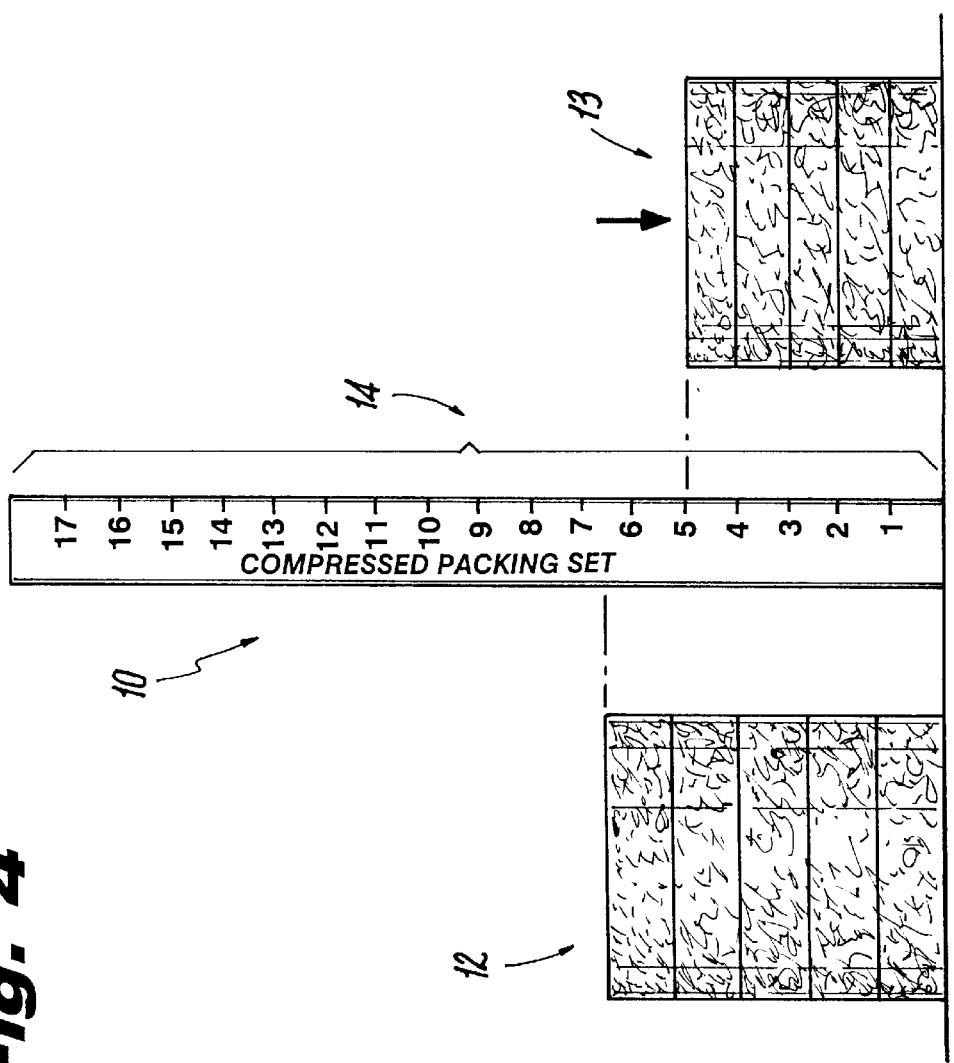
FIG. 4 is a rear elevation view of the packing ruler of FIG. 1, illustrating an exemplary dimensional difference between a stack of uncompressed and compressed packing rings.
Figure 3:
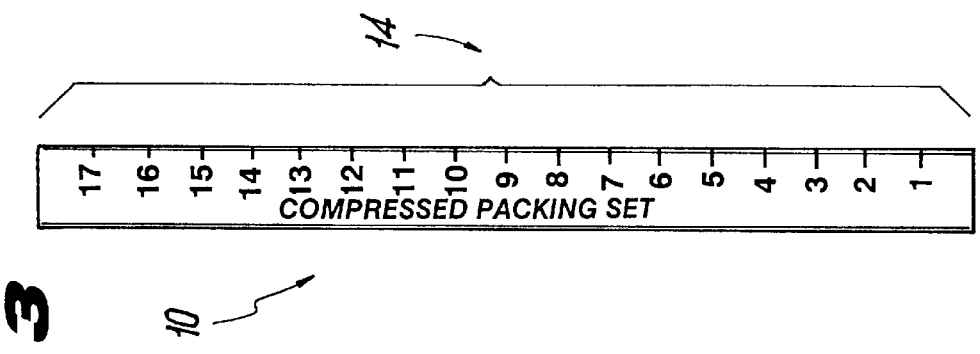
FIG. 3 is a rear elevation view of the packing ruler of FIG. 1 demarcated to indicate the number of packing rings, having a set optimal compression, needed to fill a stuffing box.
Figure 9:
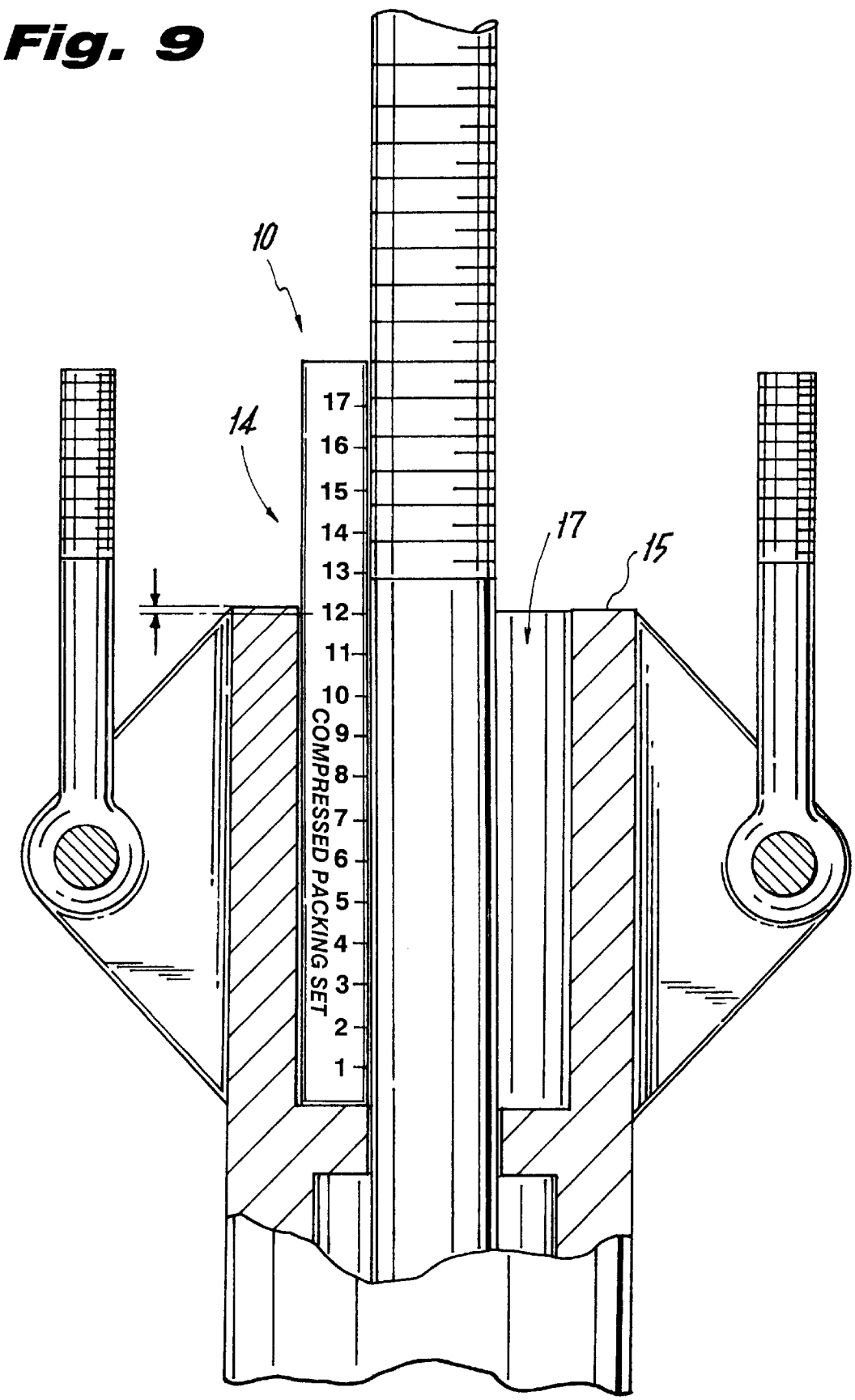
FIG. 9 is a sectional elevation view of the stuffing box of FIG. 6 showing a rear view of the packing ruler of FIG. 1 inserted therein.
Figure 10:
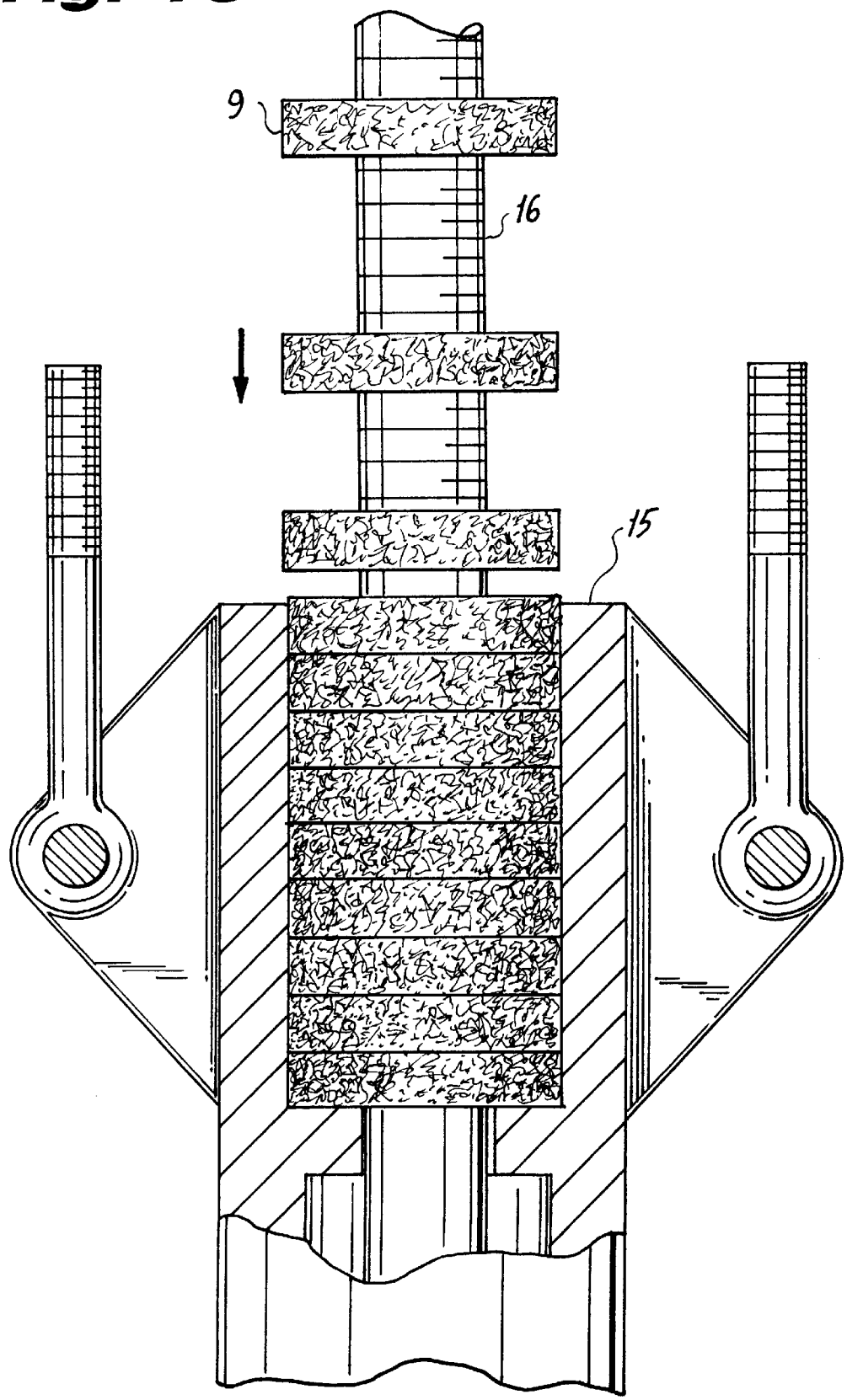
FIG. 10 is a sectional elevation view of a stuffing box of FIG. 9 with spool stock packing rings being installed.
Figure 11:
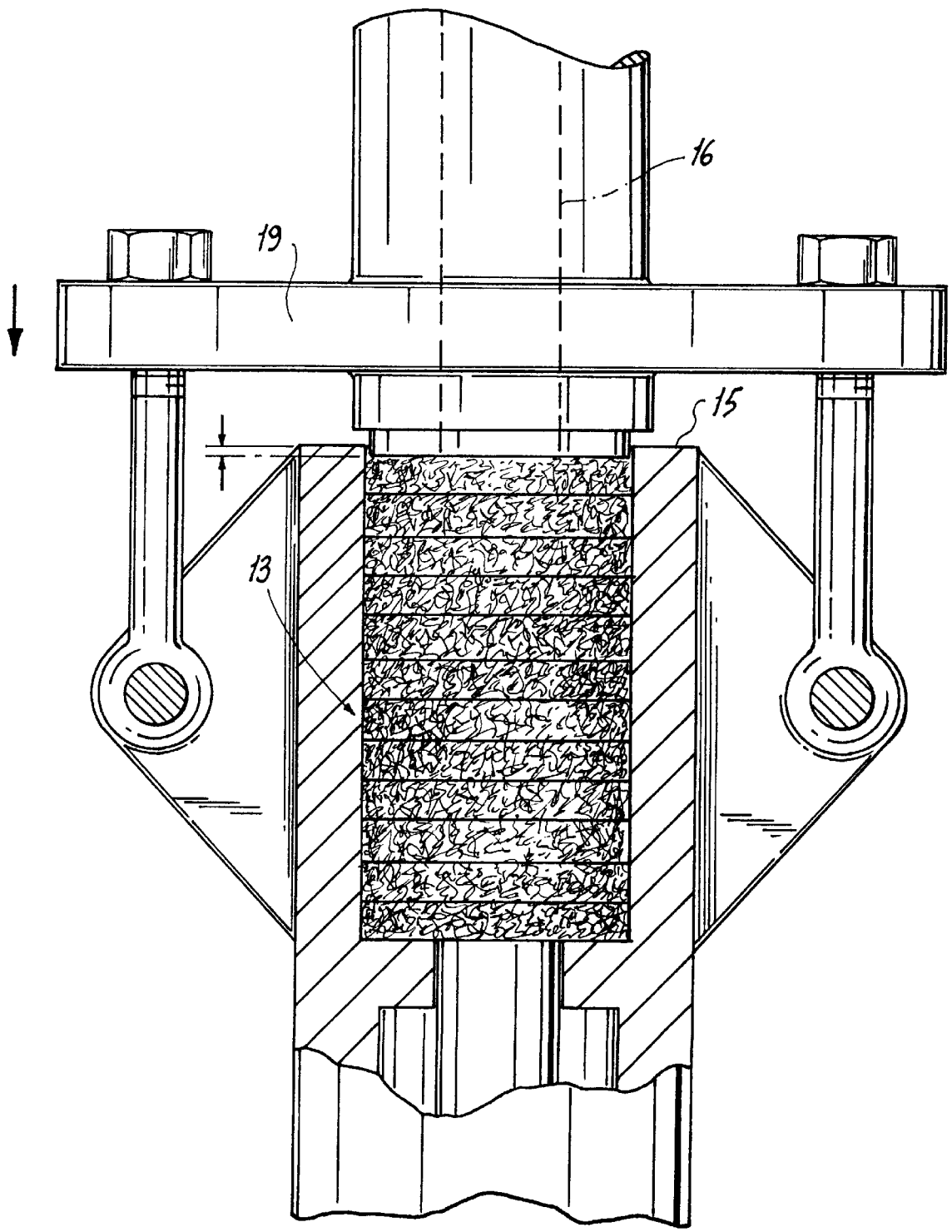
FIG. 11 is a section elevation view of the stuffing box of FIG. 8 showing the gland penetration.

FIG. 3 illustrates a representative Packing Ruler 10 with a graded Compressed Packing Set Scale 14 for determining the number of packing rings at optimal compression which would be needed to fill a stuffing box without need to recourse to non-compressible bushing rings. Such scale may optionally be placed on the opposing surface of the ruler of FIG. 1. As illustrated in FIG. 4, Compressed Packing Set Scale 14 takes into account the space filing dimensional differences between Uncompressed Packing Ring Stack 12 and Compressed Packing Ring Stack 13. As illustrated in FIG. 9, Compressed Packing Set Scale 14 on Packing Ruler 10 is used to determine the number of compressed packing rings needed to fill Stuffing Box Void 17 by inserting Packing Ruler 10 into Stuffing Box Void 17 and reading the scale at the point where the ruler is level with the top of Stuffing Box 15, rounding down to the nearest bushing scribe mark. The appropriate number of Individual Non-Compressed Packing Rings 9 are then inserted around Shaft 16, and, as shown in FIG. 10, and Gland 19 is applied to compress the packing rings to form a Stack of Compressed Packing Rings 13 as shown in FIG. 11.

Figure 5:
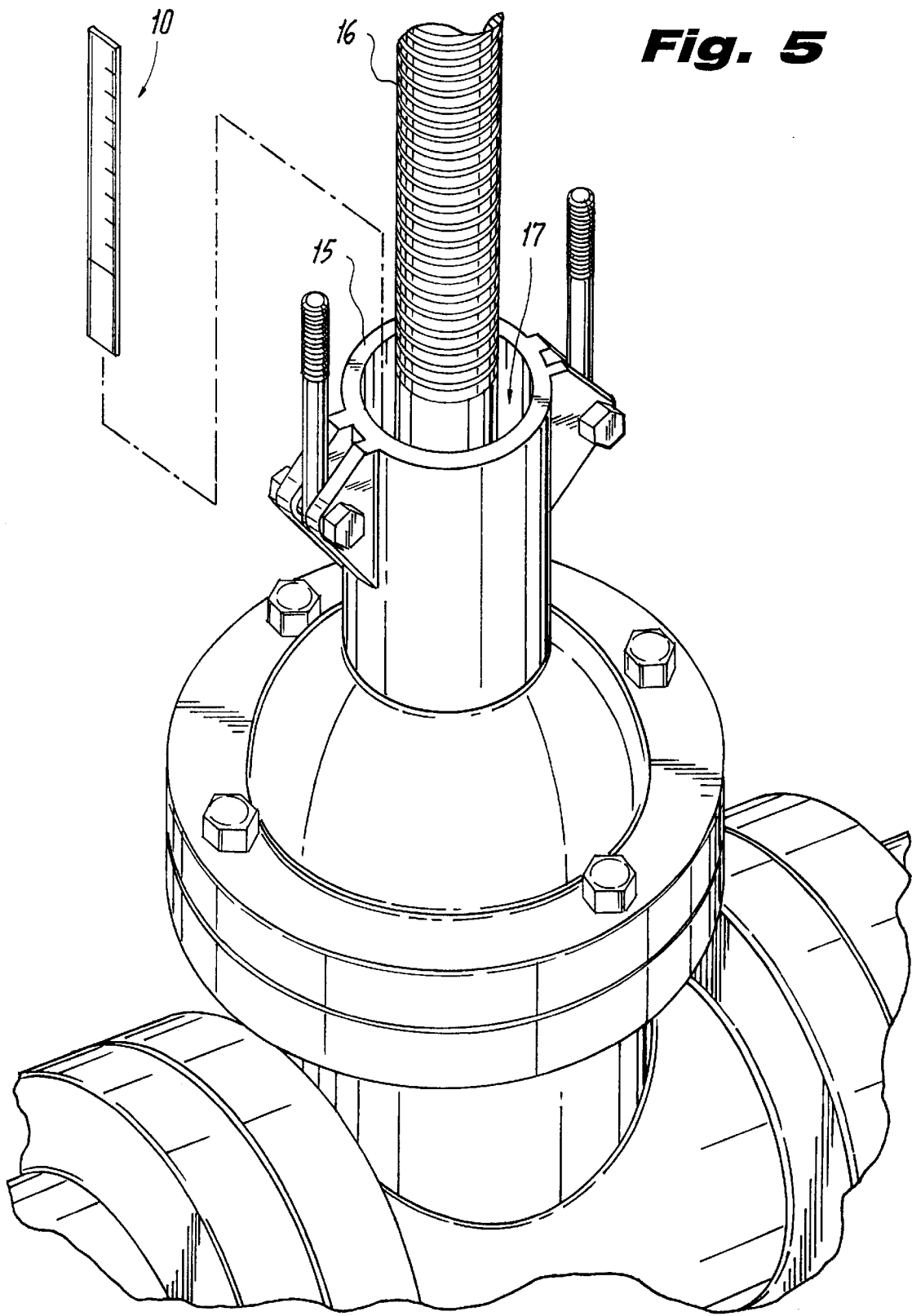
FIG. 5 is an exploded perspective view of the front view of the packing ruler embodiment of FIG. 1 adjacent an unpacked value stuffing box.
Figure 6:
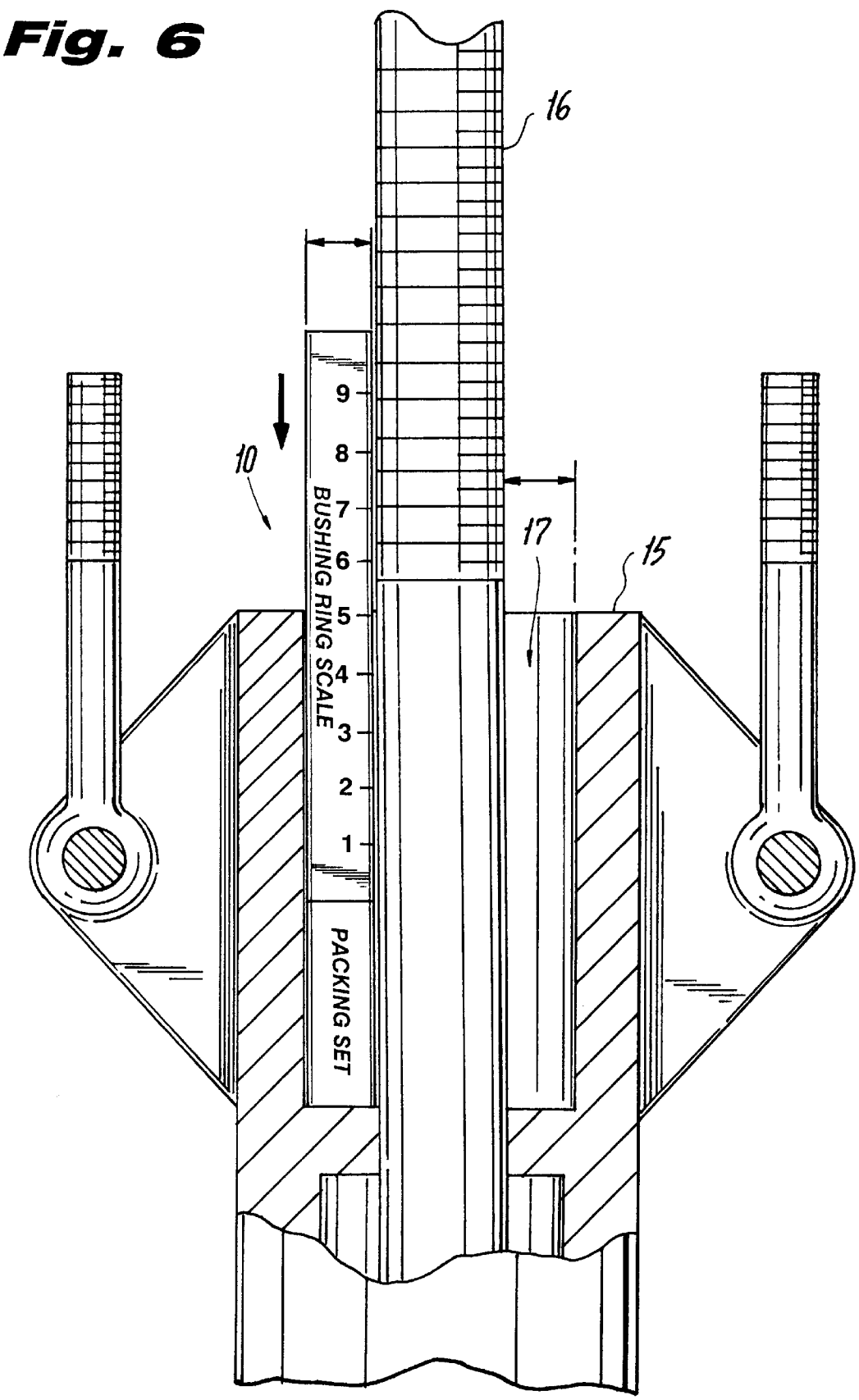
FIG. 6 is a sectional elevational view of a stuffing box showing a frontal view of the packing ruler of FIG. 1 installed in the unpacked stuffing box shown in FIG. 5.
Figure 7:
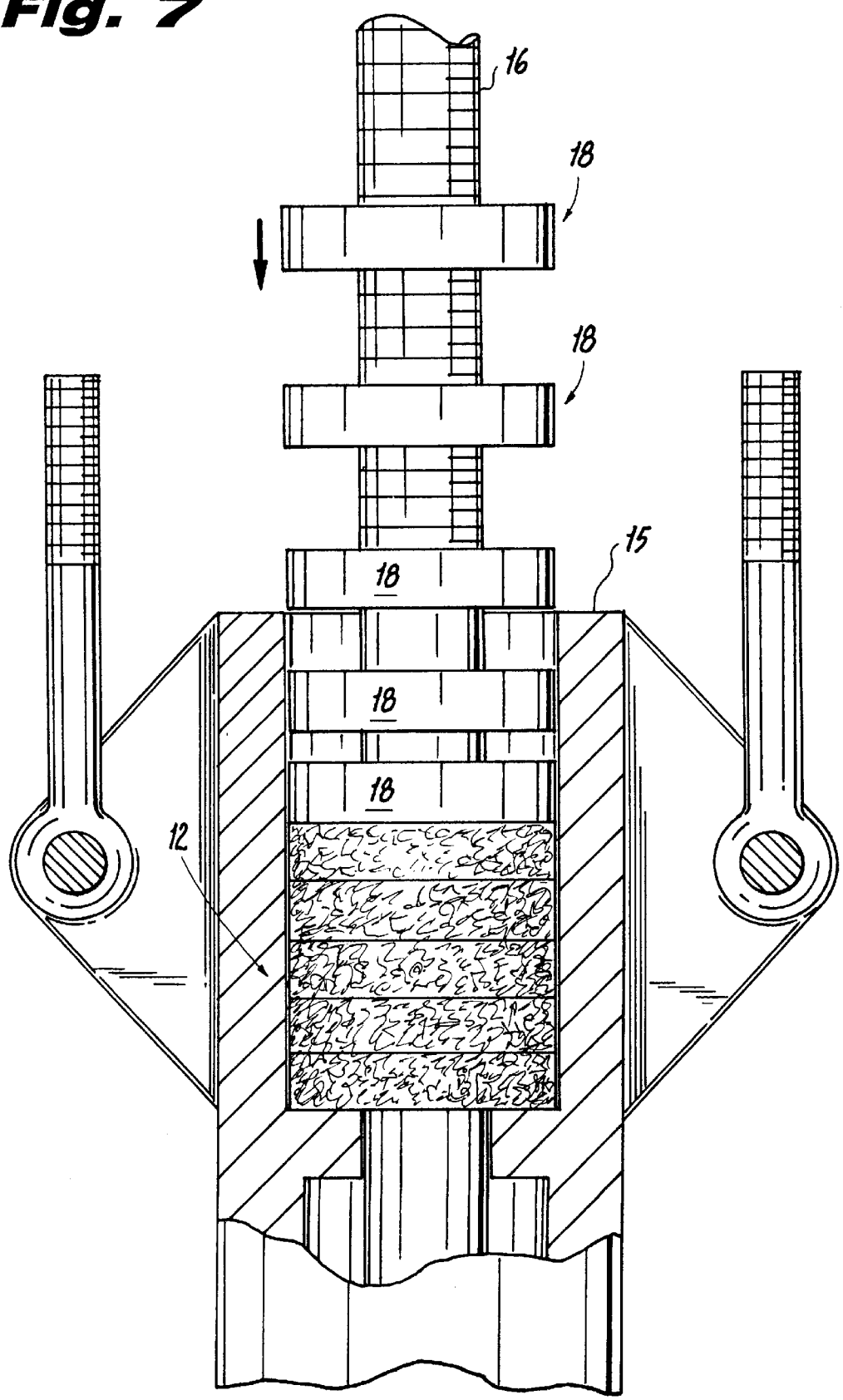
FIG. 7 is a sectional elevational view of a stuffing box of FIG. 6, with the packing set and bushing rings being installed.
Figure 8:
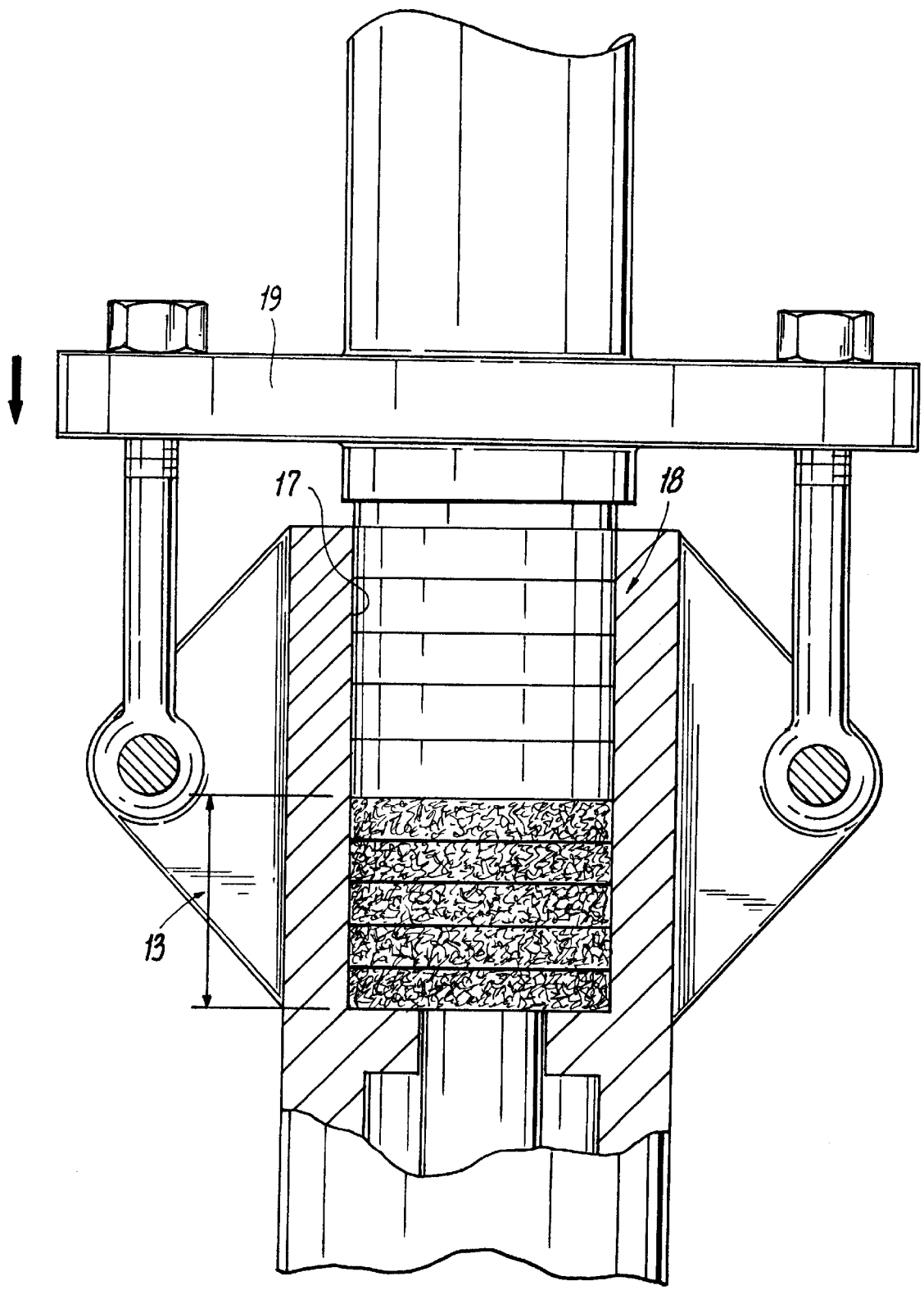
FIG. 8 is a cross sectional elevation view of a stuffing box of FIG. 7 with the packing materials compressed by the gland.

FIG. 5 is an exploded perspective view of Packing Ruler 10 of FIG. 1 adjacent unpacked Stuffing Box 15 surrounding Shaft 16. As illustrated Packing Ruler 10 is dimensioned such that it is adapted to fit in Stuffing Box Void 17 separating Stuffing Box 15 from Shaft 16. The mechanic, knowing the width of the ruler could use the same as a "feeler gauge" to estimate the width of the cross-sectional gap that exists between Shaft 16 and Stuffing Box 15. FIG. 6 is a sectional elevation view of Stuffing Box 15 showing Packing Ruler 10 positioned in Stuffing Box Void 17, the number of bushing rings needed to fill Stuffing Box Void 17, when such void is partially filled with a packing ring set of predetermined number of rings at optimal compression, can be determined by reading the scale at the point where the ruler is level with the top of Stuffing Box 15 and rounding down to the nearest bushing scribe mark. FIG. 7 shows uncompressed Packing Ring Set 12 and non-compressible bushing rings 18 added to fill Stuffing Box 15, and, as shown in FIG. 8, Gland 19 is used to compress the fill in Stuffing Box Void 17, resulting in Stack of Compressed Packing Rings 13 and Stack of Uncompressed Bushing Rings 18.

Figure 13:
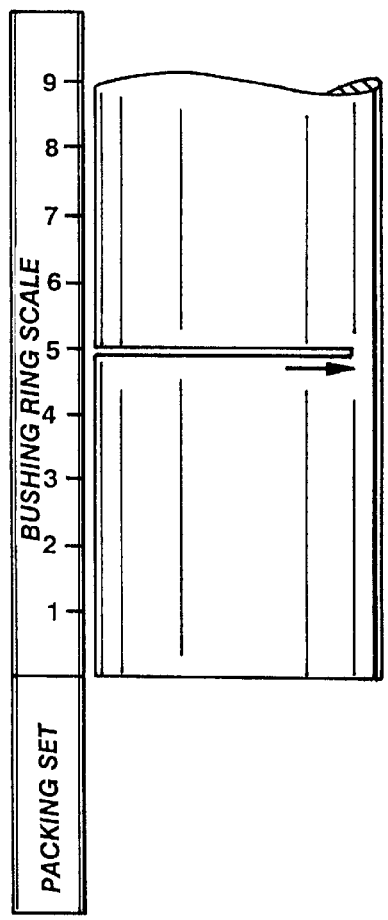
FIG. 13 is an elevation view of the packing ruler of FIG. 1 being used to mark a bushing ring tube for cutting.
Figure 12:
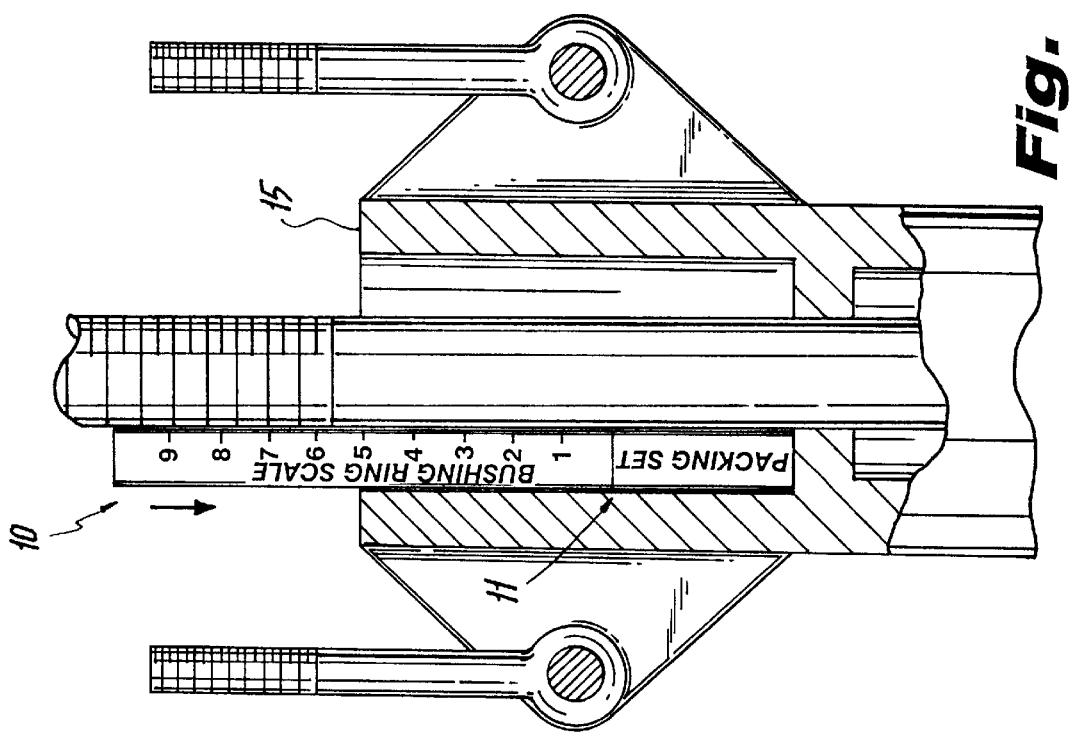
FIG. 12 is a sectional elevation of the stuffing box of FIG. 5 wherein the packing ruler of FIG. 1 is used to measure the differential between the packing set dimension and the top of the stuffing box.

As would be understood by one of ordinary skill in the art, Packing Ruler 10 could be used, as shown in FIGS. 12 and 13, to measure the differential between Packing Set Demarcation 11 and the top of Stuffing Box 15 and a Bushing Ring Tube 20 could be marked for cutting at the appropriate level, and such cut bushing ring tube used to fill Stuffing Box Void 17.

Figures 14, 15:
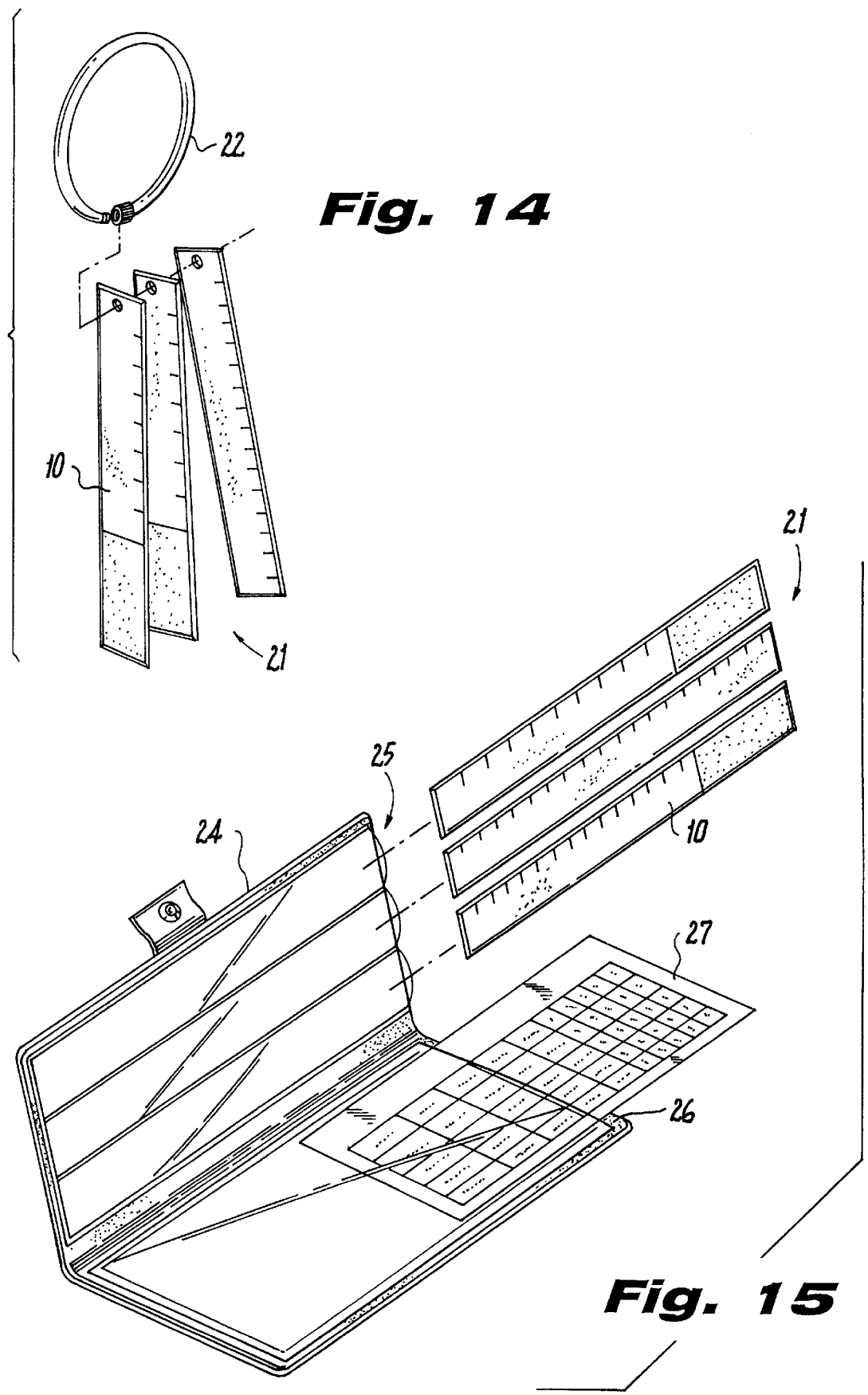
FIG. 14 is an exploded view of a representative packing ruler set carried on a ring.
FIG. 15 is an exploded view of a representative packing ruler set carried in a case, with a dimensional calculation chart.

Now referring to FIG. 14, there is shown an exploded view of representative Packing Ruler Set 21 carried on a Split Ring 22. As illustrated, each individual Packing Ruler 10 has a Opening 23 therein to permit said Split Ring 22 to course there through. Each Packing Ruler 10 can be devised with different scales to account, for example, for the use of different packing sets, packing rings having different optimal compressions, and whether packing rings alone, or packing rings and bushings will be used to pack the stuffing box. As shown in FIG. 15, the representative Packing Ruler Set 21 may also be stored in Wallet Holder 24 which may have Individually Compartmentalized Housings 25 to store each individual Packing Ruler 10. Wallet Holder 24 may further have a Housing 26 to House a Chart 27 or Directions which may be used in conjunction with the Packing Ruler Set 21. As shown in FIG. 16, Chart 27 may show representative dimensions, for example, in about a 30% compression, five ring packing set format, that could be followed in laying out the scribe marks for an unmarked packing ruler. The system could be utilized in a plurality of possible combinations and over a wide range of English and Metric sizes, cross-sectional increments, percent compressions and ring number arrangements, as would be understood to one of ordinary skill in the art.

While the invention has been described with respect to preferred embodiments, those skilled in the art will readily appreciate that various changes and/or modifications can be made to the invention without departing from the spirit or scope of the invention as defined by the appended claims.

What is claimed is:

1. A ruler for aiding in packing a stuffing box surrounding a shaft comprising:

an elongate rectangular body having a top face and bottom face, opposite parallel longitudinal edges, and a measurement scale along at least one longitudinal edge; said measurement scale comprising at least: one mark located at a pre-determined distance form an end of said body, said predetermined distance being equal to the optimal compressed height of a compressible set of packing rings, each packing ring having about the same optimal compression and dimension, and a linear series of graduation marks of repeat basic measurement units starting from the location of said one mark, wherein the distance between sucessive graduation marks is equal to the height of non-compressible bushing rings of about the same dimension.

2. The ruler of claim 1 wherein said opposite parallel edges are beveled.

3. A ruler set for aiding in packing a stuffing box surrounding a shaft comprising:

at least two elongate rectangular bodies having a top face and bottom face, opposite parallel longitudinal edges, and a measurement scale along at least one longitudinal edge of each rectangular body;

wherein each said rectangular body has a measurement scale thereon that differs from the other rectangular bodies and wherein said measurement scale comprises a linear series of graduation marks of repeat basic measurement units, wherein the distance between successive graduation marks is equal to the height of non-compressible bushing rings of about the same dimension, said linear series of graduation marks starting from one mark located at a predetermined distance from an end of said rectangular body, said predetermined distance being equal to the optimal compressed height of a compressible set of packing rings, each packing ring having about the same optimal compression and dimension.

4. The ruler set of claim 3 wherein said at least two elongate rectangular bodies are connected through a hole therein to a ring.

5. The ruler set of claim 3 wherein each of said at least two elongate rectangular bodies are housed in a separate compartment housed within a unitary housing.

6. A method for determining the number of uniform non-compressible bushing rings needed to fill a stuffing box, formed by a surrounding stuffing box housing, encompassing a shaft, comprising the steps of:

selecting a set of approximately uniform compressible packing rings having about the same optimal compression;

selecting an elongate ruler having along its length a mark located at a pre-determined distance from an end of the body, said pre-determined distance being equal to the height of said set of uniform compressible packing rings when optimally compressed as well as a linear series of graduation marks, superior to said mark, starting from the location of said mark, wherein the distance between successive graduation marks is equal to the height of said uniform non-compressible bushing rings;

inserting said ruler width-wise into said stuffing box; and reading the non-compressible bushing ring mark on the ruler that most closely is associated with the top of the stuffing box housing surrounding the stuffing box.

7. The method of claim 6 further comprising the step of: selecting the compressible packing rings and non-compressible bushing rings to fill the stuffing box.

8. The method of claim 6 further comprising the step of: placing the compressible packing rings and non-compressible bushing rings around the shaft in the stuffing box.

* * * * *